(12) United States Patent
Bassett

(10) Patent No.: US 8,006,820 B2
(45) Date of Patent: Aug. 30, 2011

(54) CLUTCH DAMPER SPRING POCKET IMPROVEMENT

(75) Inventor: Michael L. Bassett, Auburn, IN (US)

(73) Assignee: Eaton Corporation, Cleveland, OH (US)

( * ) Notice: Subject to any disclaimer, the term of this patent is extended or adjusted under 35 U.S.C. 154(b) by 273 days.

(21) Appl. No.: 12/193,386

(22) Filed: Aug. 18, 2008

(65) Prior Publication Data

US 2009/0045025 A1 Feb. 19, 2009

Related U.S. Application Data

(60) Provisional application No. 60/965,271, filed on Aug. 17, 2007.

(51) Int. Cl.
*F16D 3/12* (2006.01)
*F16D 3/66* (2006.01)
*F16D 13/64* (2006.01)

(52) U.S. Cl. ............................. 192/212; 464/68.1
(58) Field of Classification Search ................ 192/205, 192/212; 464/68.1, 68.92
See application file for complete search history.

(56) References Cited

U.S. PATENT DOCUMENTS

| | | | | |
|---|---|---|---|---|
| 2,028,951 | A | * | 1/1936 | Reed ............................ 192/213 |
| 3,107,551 | A | * | 10/1963 | Cline ........................... 464/68.3 |
| 4,789,375 | A | * | 12/1988 | Bassett ........................ 464/68.8 |
| 5,908,100 | A | | 6/1999 | Szadkowski |
| 6,244,962 | B1 | * | 6/2001 | Bacher et al. .............. 464/68.92 |
| 6,484,860 | B1 | | 11/2002 | Bassett |

* cited by examiner

*Primary Examiner* — Richard M. Lorence
(74) *Attorney, Agent, or Firm* — Kevin M. Hinman

(57) ABSTRACT

A torsional damper with a hub assembly and a disc assembly has coil springs disposed therebetween. The coil springs are disposed in pockets defined in part by apertures in opposed cover plates. The apertures have sharply angled end portions providing deflection relief near the ends of the coil springs.

4 Claims, 6 Drawing Sheets

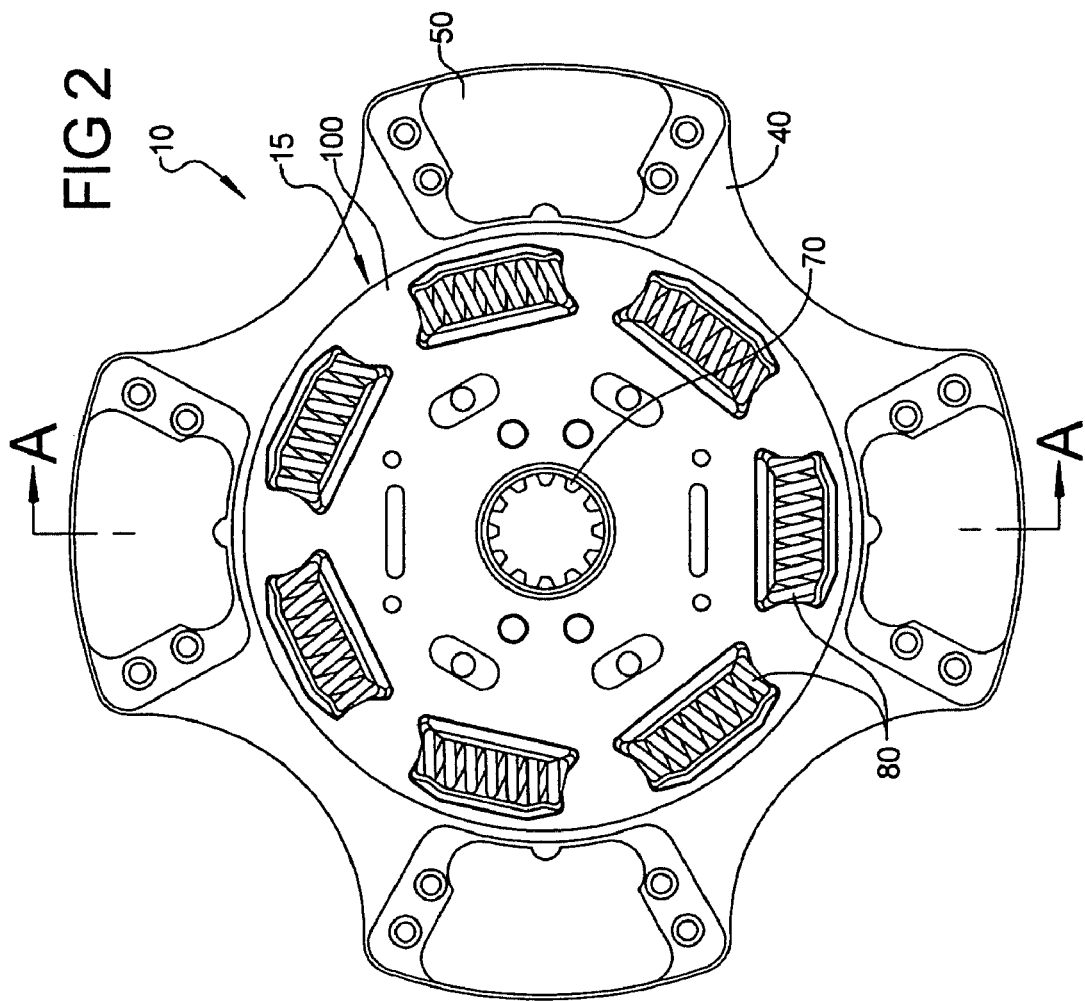
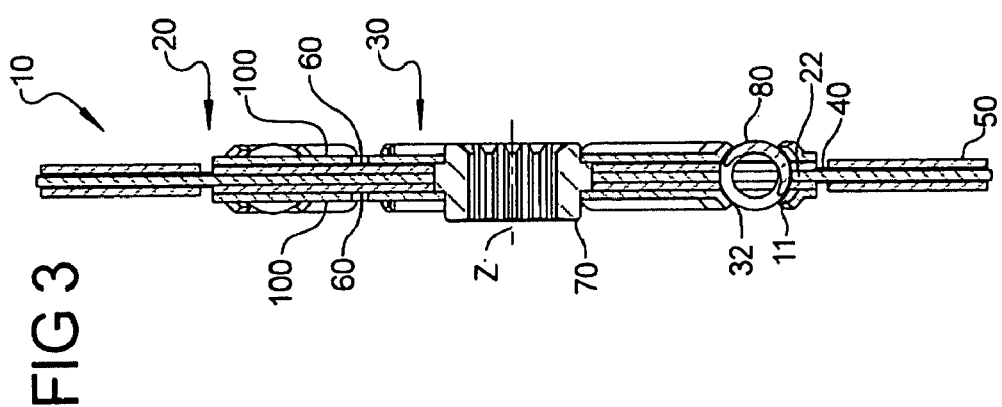

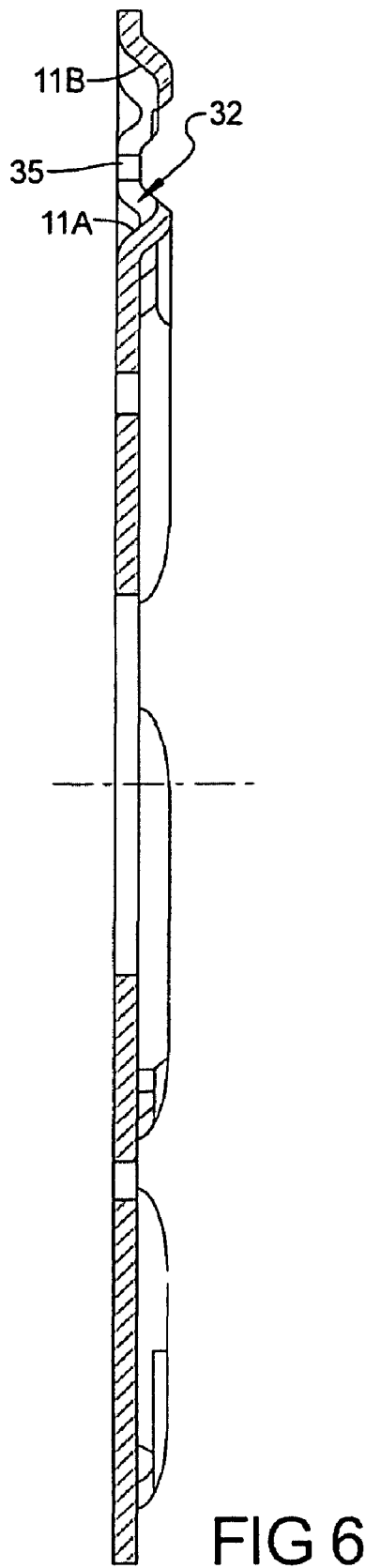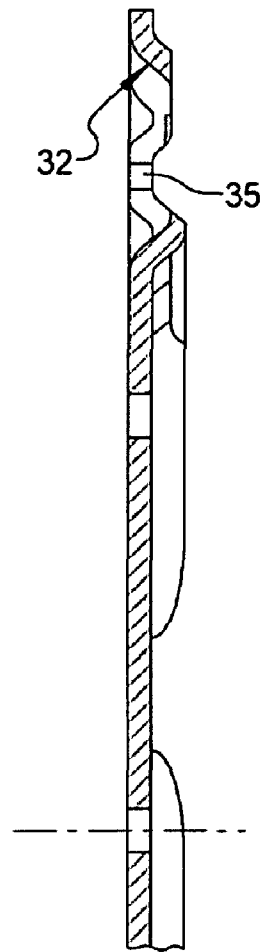
FIG 6
FIG 7

CLUTCH DAMPER SPRING POCKET IMPROVEMENT

RELATED APPLICATIONS

This application claims the benefit of Provisional Application 60/965,271, filed Aug. 17, 2007 the disclosure of which is incorporated herein by reference.

FIELD OF THE INVENTION

The present invention relates to the field of torsional vibration dampers in general, and more specifically, to friction clutches having torsional vibration dampers.

BACKGROUND OF THE INVENTION

Torsional vibrations are the rotational irregularities of a rotatingly driven component. In a vehicle drivetrain, torsional vibrations are caused by the forces generated within a combustion engine by the combustion of gases during the periodic combustion process. Torsional vibrations of the second or third order which originate from the engine, as a result of the ignition frequency of four or six cylinder engines, respectively, are predominant in the vehicle driveline. Torsional vibrations not only emanate from the engine power pulses but also from torque spikes and from abrupt changes in driveline torque due to rapid engine acceleration and deceleration.

Torsional vibrations cause premature wear to driveline components as well as audible noise. In a conventional driveline, the flywheel, which is rigidly connected to the crankshaft, will generate high reaction forces on the crankshaft. Torque irregularities from a periodic combustion also engine adds additional stress in the form of high frequency torques to the transmission. Furthermore, when a manual transmission is in neutral, gear rattle occurs, which is also an audible event, due to the teeth of meshing gears lifting away from another and then striking each other as a result of high frequency torque fluctuations.

Along with gear rattle, order based responses from the second or third engine order may be passed through the drivetrain and into the body structure. This sound can be greatly amplified if the components forming the sound are excited at their resonant frequencies.

Torsional vibration issues are further compounded by efforts to improve vehicle efficiency. Reductions in vehicle size and weight as well as reductions in driveline component inertia, such as flywheel masses, as well as reductions in transmission oil viscosity have added to the existing torsional vibration challenges. Lower drivetrain inertia results in a higher natural frequency of the drivetrain. As the engine rotational speed passes through the drivetrain natural frequency, resonant frequency occurs. The input displacement of a system is amplified at resonant frequency.

It is well known in the art to incorporate torsional vibration damping mechanisms in a dry clutch. As rotation occurs, the energy storage means within the damper, typically coil springs, provide the rotational compliance between the rotating elements. Another component of the damper is hysteresis, which is provided by friction producing elements. The hysteresis cooperates with the energy storage component of the damper to remove energy from the system. The prior art is replete with friction clutches with dampers for attenuating torsional vibrations. A variety of spring arrangements have been employed to provide frictional force for damping.

The coil springs are typically disposed in spring pockets circumferentially located around a clutch hub. Compression of the springs is typically limited by a stop disposed between the hub and the disc limiting relative rotation therebetween. The springs provide some isolation between the engine and transmission of firing pulses of the engine and other engine speed fluctuations. However, point loading between the springs and the spring pockets occurs at ends of the springs, producing wear of one or both parts. Also, within the range of travel permitted by the stop or stops, the springs tend to move relatively freely within the pockets, bowing and rubbing against the sides of the pockets. This spring motion and wear may potentially lead to the springs breaking, or to an increase in the size of the spring pocket, diminishing the dampening effectiveness of the clutch and potentially enabling the spring to escape the clutch driven disc assembly.

It is desired to minimize such wear and the associated loss of damper effectiveness by improving the interface between the components to increase the effective life of the dampers.

SUMMARY OF THE INVENTION

A torsional damper with a hub assembly and a disc assembly has coil springs disposed therebetween. The coil springs are disposed in pockets defined in part by apertures in opposed cover plates. The apertures have sharply angled end portions providing deflection relief near the ends of the coil springs.

BRIEF DESCRIPTION OF THE DRAWINGS

FIG. 2 is a front view of a driven disc incorporating a representative damper.

FIG. 3 is a cross-sectional view of the driven disc of FIG. 2 along section A-A.

FIG. 6 is a sectional view in the directions of arrows 7 of FIG. 5.

FIG. 7 is a sectional view in the directions of arrows 8 of FIG. 5.

DETAILED DESCRIPTION OF THE PREFERRED EMBODIMENT

Figure 1:
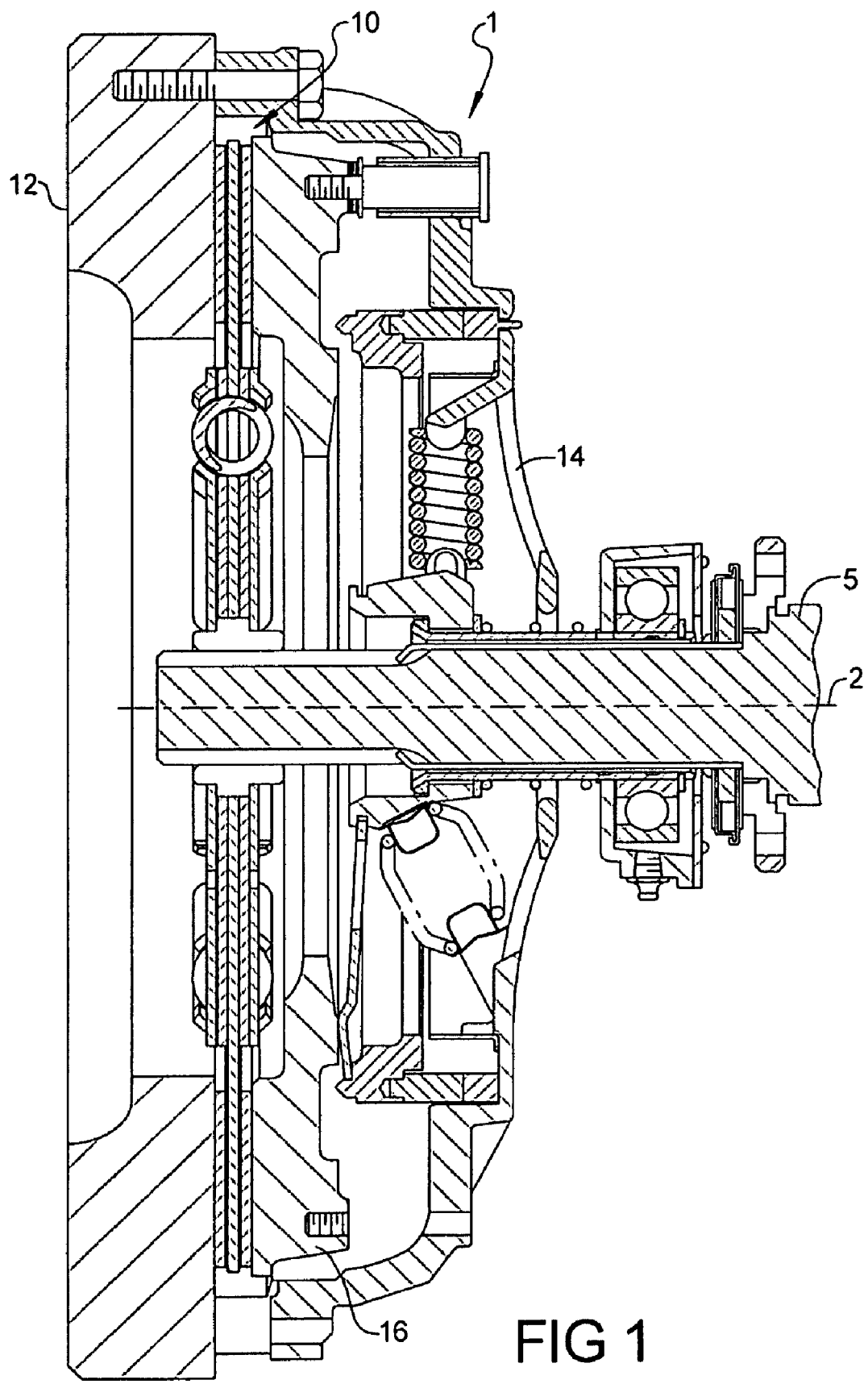
FIG. 1 is a cross-sectional view of a clutch incorporating a representative damper.
Figure 4:
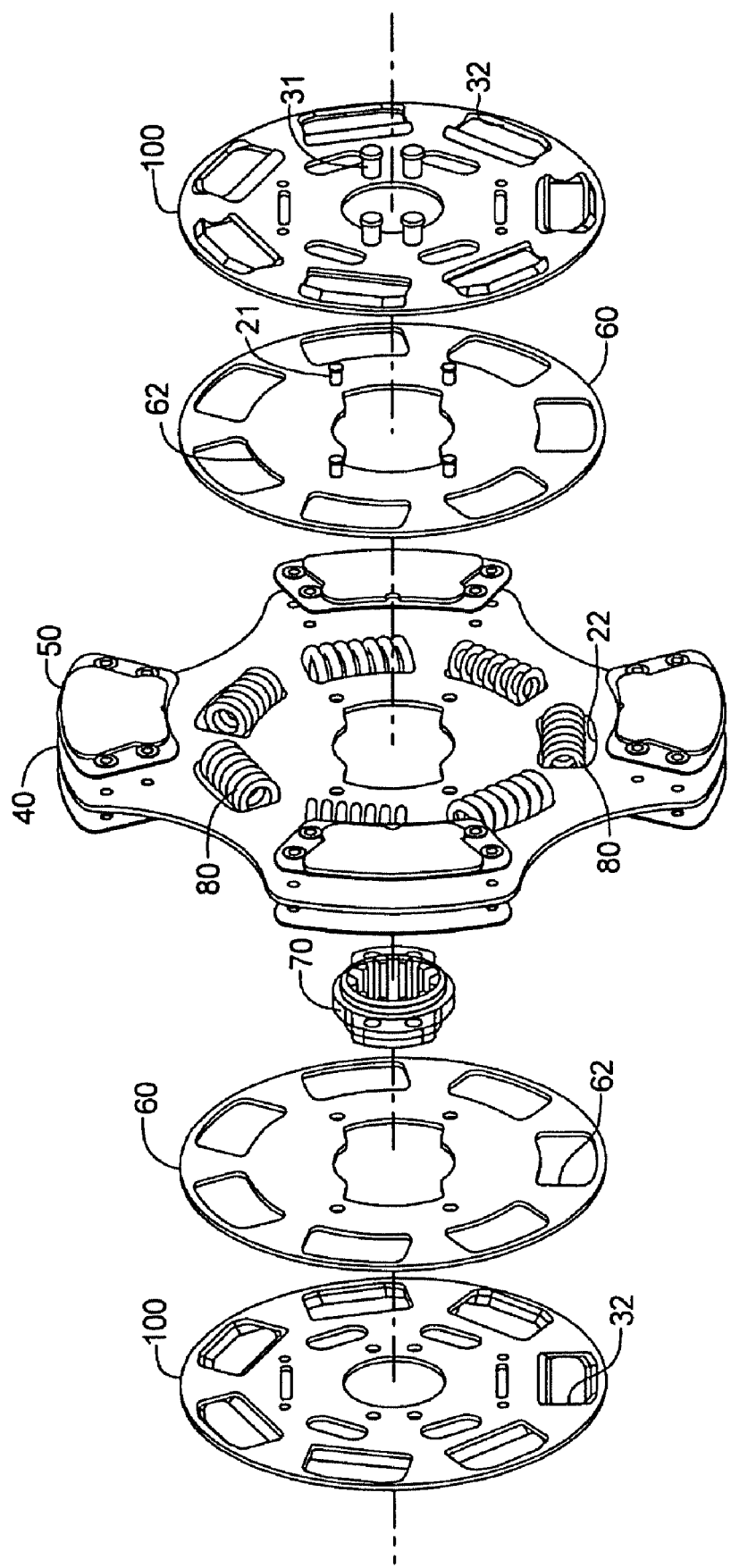
FIG. 4 is an exploded perspective view of the driven disc of FIG. 2.
Figure 5:
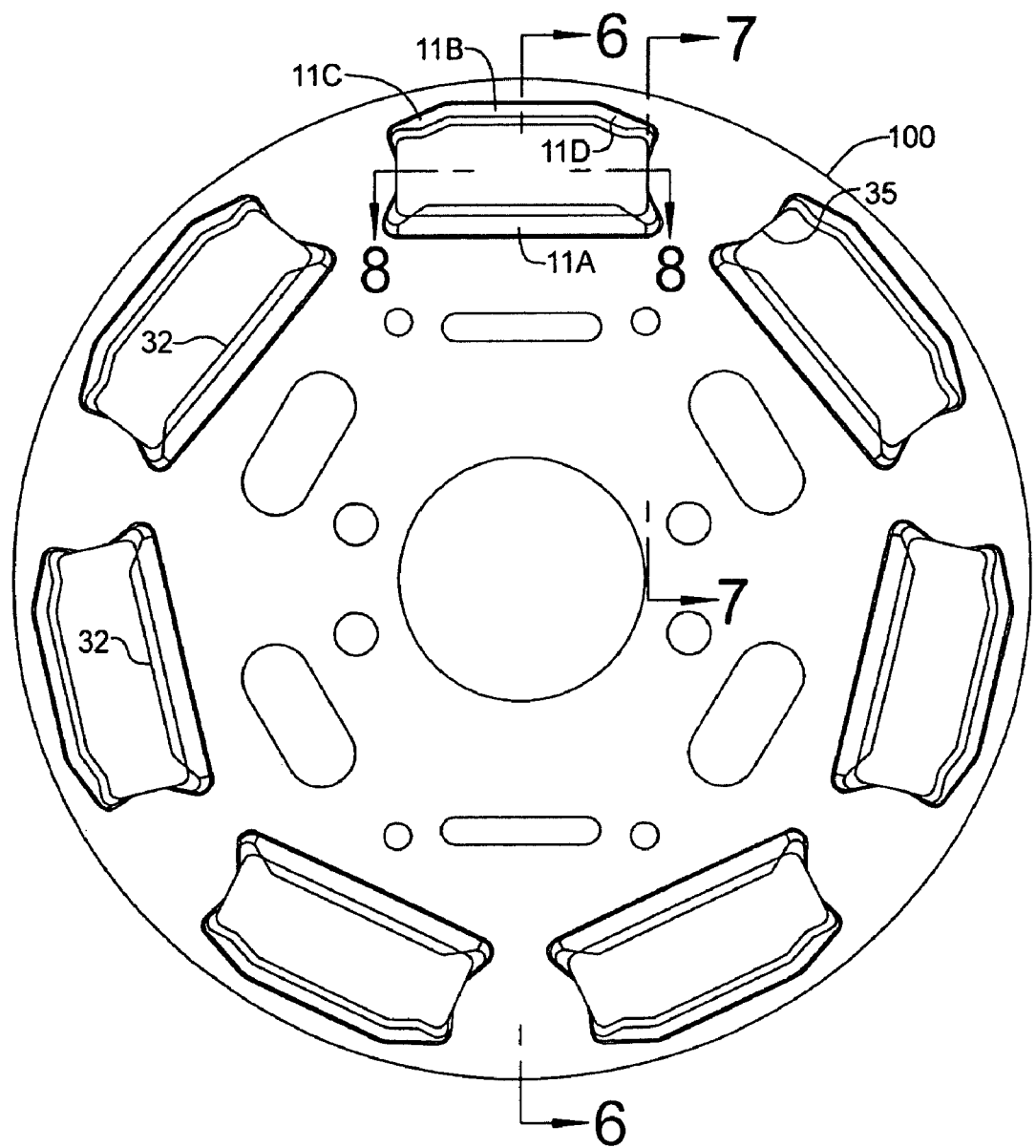
FIG. 5 is a front view of a spring cover plate incorporating the improved spring aperture of the present invention.
Figure 8:
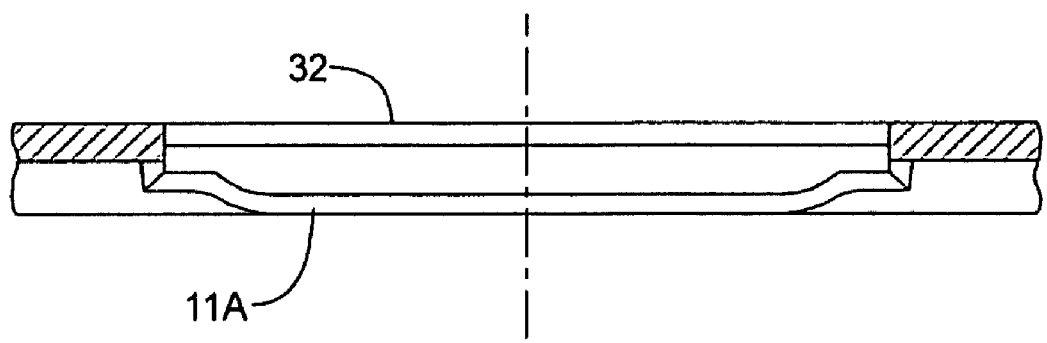
FIG. 8 is a sectional view in the directions of arrows 9 of FIG. 5.
Figure 9:
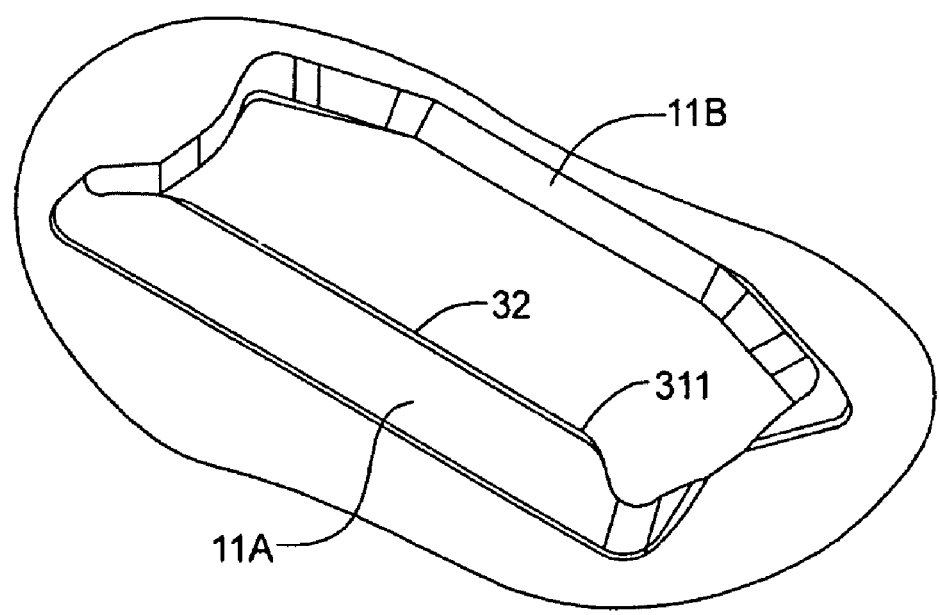
FIG. 9 is a broken out perspective view of an aperture of FIG. 5.

Referring now to FIG. 1, a cross-sectional view of a representative friction torque device 1 into which the present invention may be incorporated is shown. The friction torque device 1 comprises a driving member 12 having an axis of rotation 2. A cover 14 is coupled to the driving member 12 for rotation therewith. A pressure plate 16 is coupled to the cover 14 for rotation therewith. A driven disc 10 is coupled to an axially extending driven shaft 5 for rotation therewith. Although driven disc 10 is shown splined to driven shaft 5, it should be apparent to those skilled in the art that any suitable means known in the art may be substituted for a splined coupling. The driven disc 10 is interposed between the driving member 12 and the pressure plate 16.

Referring now to FIGS. 2 and 3, representative driven disc 10 is shown. Driven disc 10 is not intended to show the only possible application of the present invention. Driven disc 10 incorporates a torsional damper 15. Driven disc 10 comprises a rotatable disc assembly 20 which includes a first plate or disc plate 40 having a plurality of apertures 22. A plurality of friction pads 50 are attached to disc plate 40 for frictional engagement with pressure plate 16 and driving member 12. A hub assembly 30 includes a hub 70 secured to a pair of facing spring cover plates 100. Spring cover plates 100 have a plurality of apertures 32 disposed therein. Disc plate and spring cover plate apertures 22, 32 are at least partially aligned. Energy storage means in the form of coil springs 80 are disposed within apertures 22, 32. Disc assembly 20 is rotatable relative to hub assembly 30. Coil springs 80 absorb torque as a function of relative rotation between the hub 70, via spring cover plate 100 and disc plate 40. Torsional damper 15 includes first plate 40 and cover plates 100 and springs 80.

In FIGS. 2 and 3, exemplary driven disc 10 comprises a rotatable disc assembly 20 having disc plate 40 fixedly attached to reinforcing plates 60 by a plurality of rivets 21. Reinforcing plates 60 each have a plurality of apertures 62 at least partially aligned with apertures 22 in disc plate 40. Hub assembly 30 includes a pair of facing spring cover plates 100 fixedly attached to hub 70 by a plurality of rivets 31. While plates 60 are shown on opposite sides of disc plate 40, other arrangements are easily anticipated by those skilled in the art, including having plates 60 on a single side of disc plate 40, having no reinforcing plates, or having more than two reinforcing plates. A benefit of reinforcing plates is that it enables the use of a thinner plate 40, beneficially reducing the rotating inertia of driven disc 10. Yet alternatively, cover plates 100 could incorporate reinforcing plates. However, with regard to the operation of the damping mechanism, the use or non use of reinforcing plates is not critical. Thicker plates can be employed as might be required to sustain the anticipated loading within torsional damper 15. Spring reaction features within apertures 62, 22 may be in part or in entirely defined by apertures in reinforcing plates or the disc plate to the extent that the either of apertures 62, 22 are smaller than the other. The combinations and arrangements of reinforcing plates, if any, are not critical to the present invention. Another factor that is not significant is whether the first plate is part of the disc assembly and the cover plates part of the hub assembly, or vice versa, with the first plate part of the hub assembly and the cover plates part of the disc assembly. Although that is not the usual arrangement in a driven disc of a frictional clutch, such an approach could be used in a driven disc, or any other torsional damper application.

Energy storage means 80 are disposed within apertures 22, 32, 62 for absorbing torque as a function of relative rotation between hub assembly 30 and disc assembly 20.

Coil springs 80 are operatively disposed between the disc assembly 20 and the hub assembly 30. More specifically, coil springs 80 contact disc plate 40 and reinforcing plates 60 at a first end and first spring cover plates 100 at a second end. Inner coil springs (not shown) radially disposed within coil springs 80 contact a feature 35 within apertures 32 at a first end and disc plate 40. As the disc assembly 20 rotates relative to hub assembly 30, torque is absorbed as a function of the resulting spring and friction damping.

FIGS. 5-9 show plate 100 in greater detail, and in particular show improved apertures 32 in spring cover plate 100. Damper pockets 11, best seen in FIG. 3, are defined by apertures 32 in oppositely disposed spring cover plates 100 with aligned spring apertures 32. Apertures 32 are characterized by parallel pocket lips or edges 11 extending in the axial direction from the surface of plate 100.

Pocket geometry plus spring preload together has been discovered to make a very significant difference in pocket wear, and by association, spring wear. These factors are particularly important with longer damper springs. The resulting optimal shape is surprising relative to past design approaches. In the past, the outer edges of the spring pockets typically took on a smooth arcuate shape. The arcuate shape restricts the displacement of the coil spring during compression and extension cycling to the arcuate shape of pocket 11. That results in constant engagement of the spring with the outer edges of the spring pocket along the entire length of the spring. Such a shape seems intuitively appropriate, as it is concentric with the plate and allows the spring to deflect along the same path that the relatively rotating pockets are moving in. However, the constant engagement results in both pocket wear and spring wear. It has been discovered that the area most severely affected by the constraint is that near the ends of the spring. The inventive flat shape of the damper pockets and the corresponding apertures 32 provides the spring with sufficient room to deflect more while still being retained in pockets 11. The result has been a significant reduction in both spring wear and pocket wear, in turn resulting in increased damper durability.

Pocket 11 still captures the ends of the spring by defining an inside diameter near the same size as the outside diameter of coil spring 80. Ends of apertures 32 are provided with flat sections 35 that extend into aperture 32. Flat sections help retain springs 80 and can provide a surface for engagement of ends of inner coil springs, should such inner coil springs be employed in the damper. The particularly beneficial improvement is the more rapid transition that the pocket provides from fully retained to a low restriction condition. Angled edge portions 11C and 11D of aperture 32 increase the space available to spring A much closer to the ends of the spring than the prior art concentric arc configuration did. Potentially, a single diameter arc with a center eccentric to and smaller than the old concentric arc could provide an advantage similar to the present invention. However, the eccentric arc may not be possible to employ without compromising the outer diameter of the plate 100 if the apertures 32 are located too close to the periphery of the plate 100. Accordingly, the illustrated embodiment has outer edge parallel 11B to inner edge 11A, in effect drawing a chord across the new arc. Portions 11C and 11D could be alternatively straight lines or arcs. In the illustrated embodiment, portions 11C and 11D are defined by an arc of approximately one half the radius of plate 32. The resultant larger cross section damper pocket provides spring 80 with increased freedom of movement in the pocket. Outer edge 11B is essentially a chord across the smaller diameter arc. Outer edge 11B extends approximately one half the length of aperture 32, with aperture 32 being measured from flat section 35 to flat section 35. The larger section of the resultant pockets 11 limits spring contact against the pockets to the end or dead coils, greatly reducing wear on both the spring and the pocket.

Axial spring preload is also a factor. Too much or too little longitudinal preload has been discovered to contribute to spring and pocket wear. Twenty percent of spring capacity has been determined to be a particularly beneficial value of spring preload. The preload is a function of the spring's free length relative to the length of the spring pocket with the assembly in the unloaded condition. By unloaded, it is meant that the clutch driven disc does not have a torsional load applied to it. Assembly of the driven disc requires chamfers on the springs and coining or chamfers on the pocket. It is to be appreciated that too much spring preload deteriorates in-vehicle performance of the damper 15 because of insufficient enough torsional absorption capacity, while too little promotes pocket wear, and leads to durability issues. The above described configuration is particularly beneficial to the use of inner coil springs.

The foregoing discussion discloses and describes the preferred embodiment of the present invention. However, one skilled in the art will readily recognize from such discussion and the accompanying drawings and claims that various changes, modifications and variations can be made therein without departing from the true spirit and fair scope of the invention as defined in the following claims.

I claim:

1. A torsional damper, comprising:
   a hub assembly rotatable about an axis of rotation and having a hub;
   a disc assembly centered with respect to the axis of rotation;
   a first plate having a plurality of circumferentially distributed first apertures and fixed to one of the disc assembly and the hub assembly for rotation therewith;
   a pair of facing cover plates with the cover plates having a plurality of aligned circumferentially distributed cover plate apertures defining spring pockets at least partially aligned with the disc apertures and the cover plates fixedly secured to the other of the disc assembly and the hub assembly to which the first plate is not fixed, the cover plates radially overlapping and sandwiching the first plate therebetween; and
   a plurality of coil springs with one spring disposed in each of the spring pockets and the plate apertures and the spring pockets retaining the coil springs therein, the coil springs being compressed with relative rotation between the hub assembly and the disc assembly;
   wherein the cover plate apertures have parallel inner and outer edges and end portions of the otherwise parallel outer edge defined at least in part by an arc eccentric to the axis of rotation and having a radius of approximately one half the radius of the cover plate and the parallel outer edge defining a chord across the arc and the end portions providing deflection relief near the ends of the coil springs.

2. A torsional damper as claimed in 1 wherein the coil spring disposed in the spring pocket is compressed to provide a twenty percent preload in an unloaded condition.

3. A torsional damper as claimed in claim 1 wherein the end portions are each defined by a straight line from where the arc is intersected by the outer edge to where the arc intersects the ends of the aperture.

4. A torsional damper as claimed in claim 1 wherein the end portions are each defined by the radius of the arc.

* * * * *